United States Patent [19]

Lenhoff, Jr.

[11] 3,789,389

[45] Jan. 29, 1974

[54] METHOD AND CIRCUIT FOR COMBINING DIGITAL AND ANALOG SIGNALS

[75] Inventor: John G. Lenhoff, Jr., Linthicum, Md.

[73] Assignee: Westinghouse Electric Corporation, Pittsburgh, Pa.

[22] Filed: July 31, 1972

[21] Appl. No.: 276,288

[52] U.S. Cl. .......... 340/347 AD

[51] Int. Cl. .......... H03r 13/17

[58] Field of Search .......... 340/347 AD

[56] References Cited

UNITED STATES PATENTS

| | | | |
|---|---|---|---|
| 3,311,910 | 3/1967 | Doyle | 340/347 AD |
| 3,573,798 | 4/1971 | Reiling | 340/347 AD |

*Primary Examiner*—Thomas A. Robinson

*Attorney, Agent, or Firm*—J. B. Hinson

[57] ABSTRACT

A method and circuit for varying the amplitude of an analog signal in response to a digital signal particularly suited for use in subranged analog to digital converters. The analog signal is applied to one of two junctions interconnected by an impedance such as a resistor and an output signal is taken from the other of the two junctions. A constant current from one or more sources is selectively switched from one of the junctions to the other in response to the digital signal to thereby modify the amplitude of the analog signal by a discrete amount. The total current flow at the junction to which the analog signal is applied and attributable to the constant current source remains essentially constant irrespective of switching thereby minimizing the effects of switching transients. When utilized in connection with a subranged analog to digital converter, the invention eliminates the need for a differential amplifier or other subtracting circuit.

12 Claims, 6 Drawing Figures

METHOD AND CIRCUIT FOR COMBINING DIGITAL AND ANALOG SIGNALS

BACKGROUND OF THE INVENTION

1. Field of the Invention

This invention relates to a method and circuit for varying the amplitude of an analog signal in response to a digital signal and, more specifically, to a method and circuit for effecting a discrete change in the amplitude of an analog voltage signal in response to a digital signal representative of the desired discrete voltage change. The invention has particular utility in connection with subranged analog to digital converters and an embodiment thereof is hereinafter described to facilitate an understanding of the invention.

2. State of the Prior Art

In converting an analog signal to a digital representation thereof, the accuracy of the digital representation is greatly dependent upon the number of bits or digits utilized to represent the analog signal. However, as the number of bits is increased, the nnmber of components required to convert the analog signal to a digital representation increases as a function of $2^n-1$.

Various techniques have been employed to minimize the number of components required in an analog to digital converter (hereinafter referred to as an A/D converter) in which a large number of bits are used to digitally represent the analog signal. For example, the analog signal may be converted to a digital signal through the use of multiple successive approximations or by converting portions of the analog signal into a digital signal in accordance with selected amplitude ranges, e.g., a subranged A/D converter.

Generally, a subranged A/D converter is faster than the successive approximation technique but requires that a digital signal representing the first subrange be subtracted from the original analog signal to determine the portion of the analog signal remaining for quantizing in the second subrange. This subtraction process is repeated for each successive subrange.

Ordinarily, since a digital signal cannot be directly combined with an analog signal, the digital signal representing the first subrange is converted to an analog signal and then subtracted from the original analog signal to obtain the analog component of the second subrange. The subtraction process is usually carried out in a highly accurate differential amplifier having good common mode rejection characteristics. Among the disadvantages of the differential amplifier is a general increase in the need for better common mode rejection characteristics with an increase in the number of bits utilized to represent the analog signal. In addition, the differential amplifier must necessarily respond to the entire range of the analog signal rather than a limited subrange.

OBJECTS AND SUMMARY OF THE INVENTION

It is accordingly an object of the present invention to provide a novel method and circuit for varying the amplitude of an analog signal in response to a digital signal.

It is another object of the present invention to provide a novel method and circuit for combining digital and analog signals.

It is yet another object of the present invention to provide a novel method and circuit for rapidly and accurately effecting a discrete change in the amplitude of an analog signal in response to a digital signal through the use of a current switching technique which minimizes switching transients.

It is a further object of the present invention to provide a novel method and apparatus for converting an analog signal to a digital signal wherein at least two conversion subranges are employed and the need for a differential amplifier to obtain the remainder of the analog signal after the first subrange has been quantized is eliminated.

These and many other objects and advantages are accomplished in accordance with the present invention by modifying an analog signal by the selective switching of one or more constant current signals in response to a digital signal. More specifically, the analog signal is applied to one of two junctions interconnected by an impedance means and an output signal is taken from the other of the two junctions. The constant current signal is then switched from one of the two junctions to the other of the junctions in response to the digital signal. For a particular value of the analog signal at a particular sampling time, the total current at the junction to which the analog signal is applied always remains substantially constant irrespective of the switching of the current signals and switching transients are thus minimized.

In employing the invention in a subrange analog to digital converter, the digital signal representing the first subrange controls the switching of current signals from constant current sources equal in number to the number of bits in the subrange. The voltage level of the original analog signal is then varied, i.e., decreased, by the amount represented by the applied digital signal. The resultant output signal represents the portion of the analog signal which remains tbe digitized in the second subrange. The subranging process may be repeated as often as desired.

DETAILED DESCRIPTION

Figure 1:
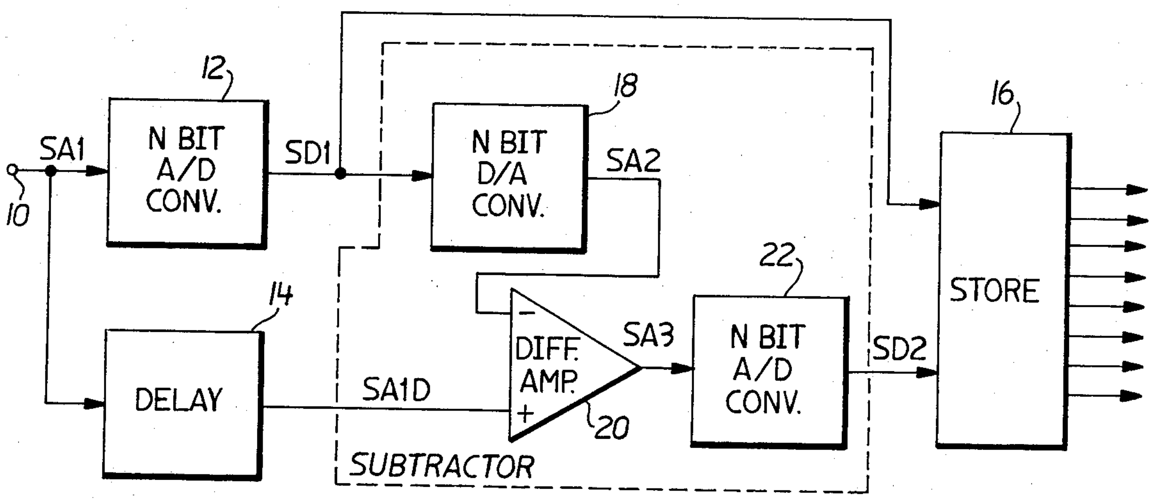
FIG. 1 (PRIOR ART)
FIG. 1 is a functional block diagram illustrating a prior art subranged analog to digital converter.

A typical prior art subranged A/D converter is illustrated in FIG. 1. Referring now to FIG. 1, the analog signal SA1 to be converted into a digital signal is applied from an input terminal 10 to both a suitable conventional N bit A/D converter 12 and a suitable conventional delay circuit 14. The A/D converter 12 is operative to convert the analog signal SA1 into a digital signal SD1 representative of the amplitude of the analog signal. The N bits of this digital signal are stored in a suitable conventional storage means such as the illustrated storage register 16 and are also applied to a conventional N bit D/A converter 18 for conversion back to an analog signal SA2.

The analog output SA2 from the D/A converter 18 is applied to the negative input terminal of a suitable conventional differential amplifier 20 and the delayed analog signal SA1D from the delay circuit 14 is applied to the positive input terminal of the differential amplifier 20. The analog output signal SA3 from the differential amplifier 20 is then applied to another N bit A/D converter 22 for conversion into a digital signal SD2 which is stored in the storage register 16.

The storage register 16 thus contains a digital representation of the analog signal at the input terminal 10. This stored digital signal includes 2N bits, the first N bits generated by the N bit A/D converter 12 representing the first subrange of the analog input signal and the second N bits from the A/D converter 22 representing a second subrange of the analog input signal.

The operation of the circuit of FIG. 1 may be more easily understood with reference to the graph of FIG. 2 wherein the entire range of the subranged A/D converter of FIG. 1 is graphically illustrated for exemplary three bit subranges.

Figure 2A:
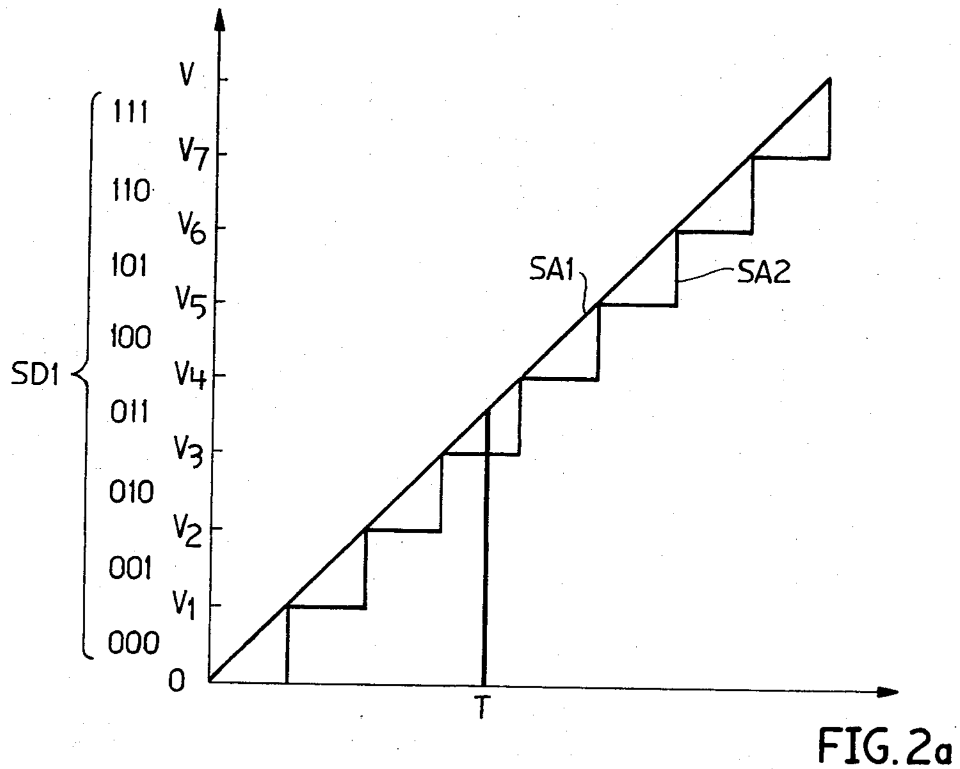
FIGS. 2*a* and 2*b* are graphs generally illustrating the operation of the prior art analog to digital converter of FIG. 1.

Referring to FIGS. 1 and 2, the amplitude of the analog signal SA1 applied to the first A/D converter 12 may vary from zero to some predetermined value V. This is graphically illustrated for the entire range of the A/D converter 12 by the ramp signal SA1 in FIG. 2*a*. The digital signal SD1 from the A/D converter 12 depends upon the amplitude of the analog signal SA1 when sampled. For example and assuming that the analog signal SA1 is sampled at time T, the digital signal SD1 representing that particular amplitude is 011. In fact, the digital signal 011 generated by the A/D converter 12 represents a range of amplitude values of the analog signal SA1 between the values $V_3$ and $V_4$. It can thus be seen that the first conversion from analog to digital by the converter 12 may be a rather rough approximation.

Figure 2B:
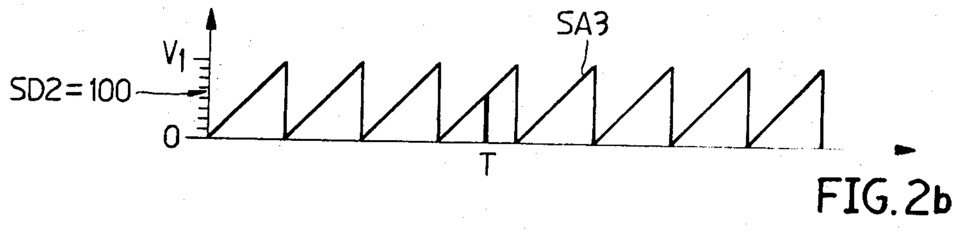

For greater accuracy, the signal SD1 is converted into an analog signal SA2 and this analog signal SA2 is subtracted from the delayed analog signal SA1 resulting in the signal SA3 of FIG. 2*b*. The signal SA3 at the exemplary sampling time T is quantized in the same manner as described above in connection with the analog signal SA1 to generate the digital signal SD2 representative of the amplitude of the remainder signal SA3. In the example of FIG. 2*b*, this digital signal SD2 may be expressed as 100 as is indicated. The resultant stored signal representing the analog signal SA1 may thus be 011100 where the digital signal representing the second subrange is listed following the digital signal representing the first subrange.

It can be seen from the above that the differential amplifier 20 must be highly accurate and must additionally be able to provide the required accuracy over the entire range of the input signal SA1 even though the maximum range of the output signal SA3 of the differential amplifier 20 is very small by comparison. In the example of FIGS. 2*a* and 2*b*, i.e., subranges represented by three bit digital signals, the ratio of the input voltage swing to the output voltage swing of the differential amplifier 20 may be 8 to 1. With a system employing subranges represented by six bit digital signals, this ratio may be 64 to 1.

Figure 3:
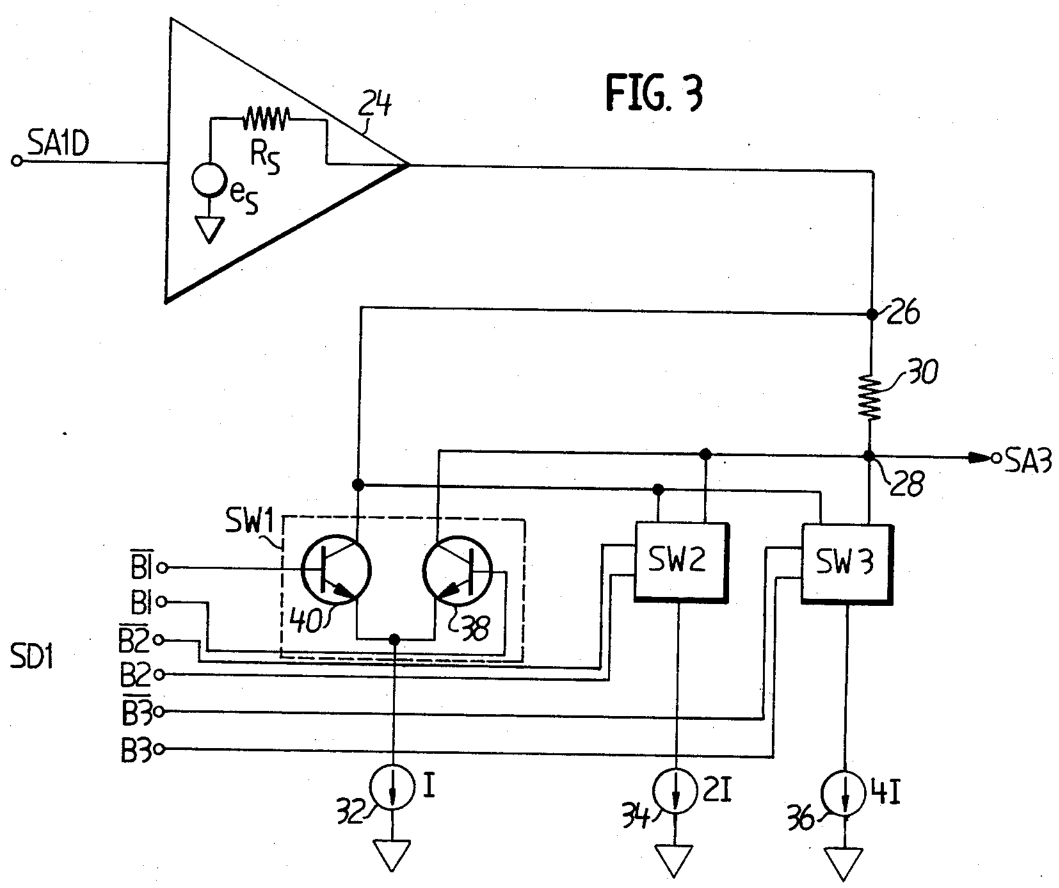
FIG. 3 is a schematic circuit diagram of one embodiment of the circuit of the present invention as utilized as the subtractor in the subranged analog to digital converter of FIG. 1.

The present invention may be utilized to replace both the N bit D/A converter 18 and the differential amplifier 20 of FIG. 1 as is illustrated in FIG. 3. Referring now to FIG. 3, the delayed analog signal SA1D may be applied through a conventional isolation amplifier 24 such as an emitter follower to a first summing node or junction 26. The junction 26 is connected to a second summing node or junction 28 through an impedance means such as the illustrated resistor 30. The analog output signal SA3 is taken from the junction 28.

A plurality of constant current sources 32, 34 and 36 equal in number to the number of bits in the digital signal SD1 are connected to signal common and are selectively connectable through electronic switches SW1, SW2 and SW3 respectively to one or the other of the junctions 26 and 28.

The switching of the current sources 32–36 from one of the junctions 26 and 28 to the other is controlled by a ditigal signal such as the digital signal SD1 from the A/D converter 12 of FIG. 1. This may be accomplished, for example, by the switches SW1–SW3 which each comprise first and second common emitter transistors 38 and 40 connected to one side of the current source being controlled by that particular switch. The collector electrode of the transistors 38 and 40 may be connected one each to the junctions 26 and 28, e.g., the collector electrode of the transistor 38 to the junction 28 and the transistor 40 to the junction 26.

The digital signal SD1 may be utilized to selectively switch the current source 32 from one of the junctions 26 and 28 to the other of the junctions by applying the appropriate bit of the digital signal and its complement, e.g., the bit B1 and its complement $\overline{B1}$ to the base electrodes of the transistors 38 and 40. In utilizing the present invention in connection with the subranged A/D converter of FIG. 1, the bits B1–B3 may be utilized to switch the current sources 32–36 to the junction 28 when these bits are at a high signal level and to the junction 26 when these bits are at a low signal level, i.e., the bits $\overline{B1}$–$\overline{B3}$ are at a high signal level. However, it should be noted that in an application wherein it is desired to increase the voltage at the junction 28 when the bits of the digital control signal are at a high signal level, the application of the bits and their complements to the switches SW1–SW3 may be reversed.

In operation, and in the absence of any high signal level bits B1–B3 in the digital signal SD1, the entire analog signal SA1D is available at the junction 28 as the output signal SA3 and all of the current from the constant current sources 32–36 bypasses the resistor 30. Assuming that the digital signal SD1 becomes 010, the switch SW2 switches the constant current source 34 from the junction 26 to the junction 28 and a current weighted in accordance with the binary weight of the digit associated with the switch SW2 flows through the resistor 30. The current flow through the resistor 30 causes the analog signal SA3 to change from its previous value to some lower discrete value. The discrete change in the amplitude of the signal SA3 is equal to the product of the switched current (2I in the present example) and the value of the resistor 30.

For example, with reference to FIG. 2*a*, the value of the signal SA1D is between $V_3$ and $V_4$ at time T. The digital signal SD1 representing the first digitized subrange is 011. Under these signal conditions, the switches SW2 and SW3 of FIG. 3 would connect the current sources 34 and 36 to the junction 28 whereas the current source 32 would remain connected to the junction 26. The analog output signal SA3 would be equal to the analog signal SA1D–$6IR_{30}$ and, through proper selection of I and R, the switched current 6I would in this example cause a drop across the resistor 30 equal to $V_3$. An analog output signal SA3 equal to the remainder signal illustrated in FIG. 2*b* would be thus provided.

It is important to note that irrespective of the positions of the switches SW1–SW3, the total current flowing into the junction 26 due to the current sources 32–36 remains essentially constant. Assuming that the transistors 38 and 40 are perfectly matched, this current relationship at the junction 26 is true even during the switching operation. Thus, switching transients do not appear at the junction 26 and signal SA3 is usable almost immediately without a settling out period.

Of course, there may be practical limits within which the transistors 38 and 40 can be matched and thus some switching transients may be present in the output signal. However, such transients are kept to a minimum through the use of this switching technique of the present invention, particularly if the source impedance of the analog signal source, e.g., the source impedance $R_s$ of the isolation amplifier 24 of FIG. 3 may be on the order of 1 ohm.

As was previously mentioned in connection with FIG. 3, the values of the current sources 32–36 may be weighted in accordance with the binary weights of the bits of the digital signal controlling the switching of the current sources. As is illustrated schematically in FIG. 4, the current sources may all be identical in value and a suitable conventional binary ladder network such as that illustrated in FIG. 4 may be utilized to weight the current signals. Moreover, as is illustrated schematically in FIG. 5, a combination of weighted current sources and a ladder network may be utilized where, for example, the digital signal contains a large number of bits.

Figure 4:
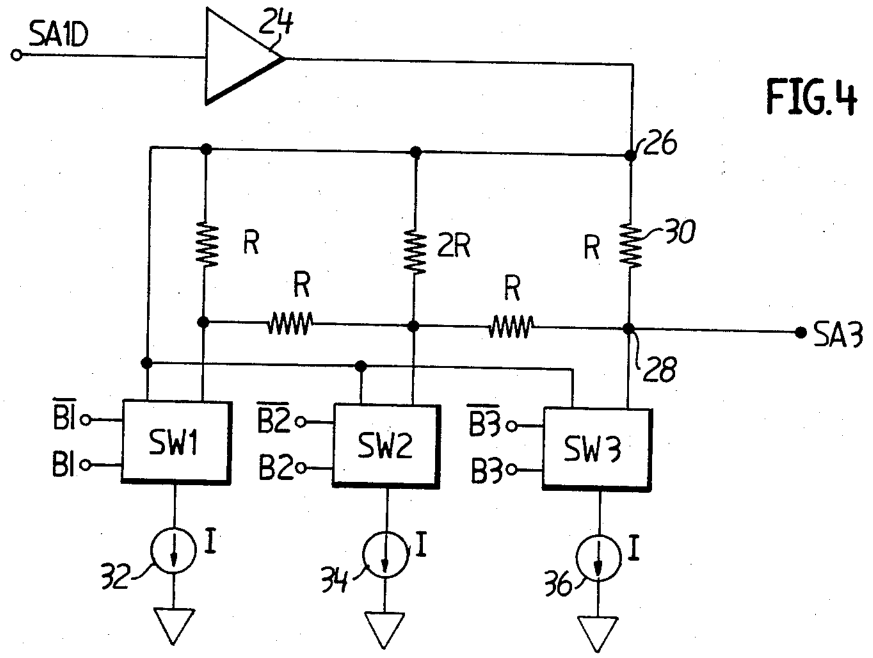
FIG. 4 is a schematic circuit diagram of a second embodiment of the subtractor of FIG. 1; and, FIG. 5 is a schematic circuit diagram of yet another embodiment of the subtractor of FIG. 1.
Figure 5:
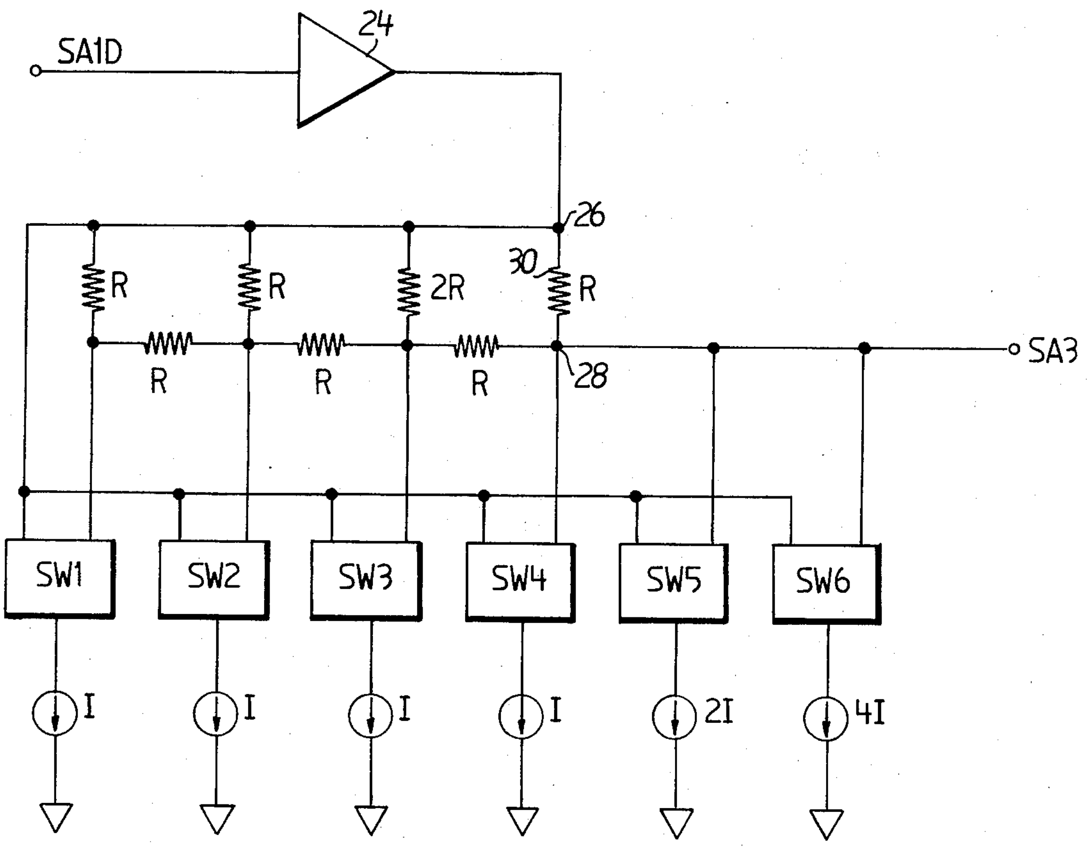

With reference to FIG. 4, the constant current sources 32–36 are equal in value and the binary weighting of the switches to corresond to the binary bit positions of the digital signal is accomplished by the weighting of the resistors paralleling the resistor 30 between the junctions 26 and 28. As shown in FIG. 5, the binary weighting of the currents to conform to the digital signal bit positions may be accomplished by the use of a combination of different values of resistors and constant current sources.

Typical values R and I in the above-described circuits may be, for example, on the order of 150 ohms and 5 ma., respectively. The values may be adjusted according to the particular application for which the circuit is employed.

It can be readily seen from the foregoing description that the present invention is particularly advantageous in a number of respects. For example, an analog signal may be varied in accordance with a digital signal through a current switching technique producing a minimum of switching transients. This, of course, permits the use of the invention in extremely high speed applications where a high degree of accuracy is required.

Moreover, the present invention greatly facilitates the combining of analog and digital signals, particularly in applications such as subranged analog to digital converters wherein the digital signal represents an analog voltage level and it is desired to provide the sum or difference of the analog and digital signals as a voltage level for further quantization.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for producing a first voltage having a known relationship to a second voltage, said relationship being determined by a digital signal, comprising the steps of:

a. coupling an impedance between first and second junctions;

b. applying said second voltage to said first junction to produce said first voltage at said second junction; and, c. selectively switching current from a source of essentially constant current from one of the junctions to the other junction in response to said digital signal to thereby vary the amplitude of said first voltage from one discrete voltage level to another, the switching being accomplished by decreasing the current from the current source to one of the junctions while substantially simultaneously increasing the current from the current source to the other junction so that the total current flow attributable to the constant current source at said first junction remains essentially constant thereby minimizing the effects of switching transients at the first junction.

2. The method of claim 1 wherein the value of the change in voltage level of said first voltage signal is substantially equal to the product of the value of the switched current and the value of the impedance.

3. The method for combining an analog signal with a digital signal comprising the steps of:

a. providing a plurality of constant current sources each having a value weighted in accordance with the digital weight of a corresponding digit of the digital signal.

b. providing two summing junctions interconnected by an impedance element;

c. applying the analog signal to one of the two summing junctions;

d. deriving an output voltage from the other of the two summing junctions; and, e. selectively switching the currents from the current sources from one of the summing junctions to the other of the summing junctions in response to the digital signal to thereby vary the output signal in amplitude as a function of both of the analog signal and the digital signal.

4. The method for combining an analog signal with a digital signal comprising the steps of:

a. providing a plurality of constant current sources;

b. providing two summing junctions interconnected by impedance elements weighted in accordance with the digital weight of a digit of the digital signal;

c. applying the analog signal to one of the two summing junctions;

d. deriving an output voltage from the other of the two summing junctions; and, e. selectively and individually switching the current from current sources from one of the summing junctions to the other of the summing junctions in response to the digital signal to thereby provide an output signal related in amplitude to both the analog signal and the digital signal.

5. A circuit for modifying the amplitude of an analog signal from one discrete voltage level to another while minimizing the effects of switching transients comprising:

impedance means operatively connected between first and second junctions circuit means for applying the analog signal to the first junction;

a source of essentially constant current; and switching means for selectively switching current from said constant current source from one of the junctions to the other junction in response to a digital signal to thereby vary the amplitude of the analog signal at the second junction from one discrete voltage level to another.

6. The circuit of claim 5 wherein said switching means comprises first and second transistors each connected to said current source and to a respective one of the first and second junctions, the digital signal controlling the switching of said switching means including a binary bit and its complement.

7. The circuit of claim 6 including isolation amplifier means operatively connected to said first junction, the analog signal being applied to said first junction through said isolation amplifier means.

8. A circuit for combining an analog voltage with a digital signal comprising:

first and second junctions interconnected by resistor means;

a plurality of sources of substantially constant current;

circuit means for applying the analog voltage to the first junction;

circuit means for providing an output signal from said second junction; and, means for applying current from said constant current sources selectively to one or the other of said first and second junctions in response to the digital signal.

9. The circuit of claim 8 including an analog to digital converter for generating the digital signal in response to the analog voltage, the digital signal representing at least a portion of the amplitude of the analog voltage.

10. The circuit of claim 9 wherein each of said means for applying current comprises first and second electronic switching means connected between said first and second junctions, respectively, and an associated one of said current sources, the operation of said first and second electronic switching means being mutually exclusive in response to appropriate bits of the digital signal.

11. The circuit of claim 10 wherein the values of said current sources are weighted in accordance with the digital weight of a corresponding digit in a predetermined digital code, each current source being switched in response to an equally weighted bit of the digital signal.

12. The circuit of claim 10 wherein said resistor means comprises a plurality of resistors weighted in value in accordance with the digital weight of corresponding digits of a predetermined digital code.

* * * * *